United States Patent [19]
Endres

[11] 3,754,276
[45] Aug. 21, 1973

[54] INSTRUMENT FOR MECHANICALLY RECORDING STRAINS

[75] Inventor: Thomas E. Endres, Kettering, Ohio

[73] Assignee: Technology Incorporated, Dayton, Ohio

[22] Filed: Aug. 9, 1971

[21] Appl. No.: 169,927

[52] U.S. Cl............................ 346/7, 8/4, 346/135, 346/137
[51] Int. Cl. ............................................ G01d 15/02
[58] Field of Search................... 346/7, 77 R, 124, 346/135, 137; 117/36.7, 63; 8/4; 73/88 R

[56] References Cited
UNITED STATES PATENTS

| | | | |
|---|---|---|---|
| 2,081,579 | 5/1937 | De Forest | 73/88 R |
| 2,260,543 | 10/1941 | Smith | 8/4 |
| 2,662,828 | 12/1953 | Dubusc | 346/135 X |
| 2,828,180 | 3/1958 | Sertorio | 8/62 |
| 2,932,967 | 4/1960 | Prewitt et al. | 73/88 R |
| 3,430,250 | 2/1969 | Prewitt et al. | 346/7 |
| 3,618,115 | 11/1971 | Parsazad | 346/7 |

*Primary Examiner*—Joseph W. Hartary
*Attorney*—William R. Jacox et al.

[57] ABSTRACT

An annular recording target is rotatably supported by a U-shaped spring clamp which projects into the center hole of the target and is formed as an integral part of a base plate adapted to be secured to a member being monitored for strains. A recording or scratch element is supported in contact with the target by an arm forming part of another base plate which is also adapted to be attached to the member being monitored. The element moves radially relative to the target in response to linear movement between the base plates, and an actuating mechanism rotates or indexes the target in one direction in response to relative linear movement between the base plates in either direction. The actuating mechanism includes diametrically opposed sets of inclined spring fingers which are supported by the arm and engage either the radial or peripheral surface of the target at 90° relative to the linear direction of movement of the recording element. The recording element may be located at different radial positions for accommodating targets of different diameters, and in one embodiment, the target is constructed of a light transmittable plastics material which is processed to form a tinted face portion which is adapted to be penetrated by the scratch element.

21 Claims, 17 Drawing Figures

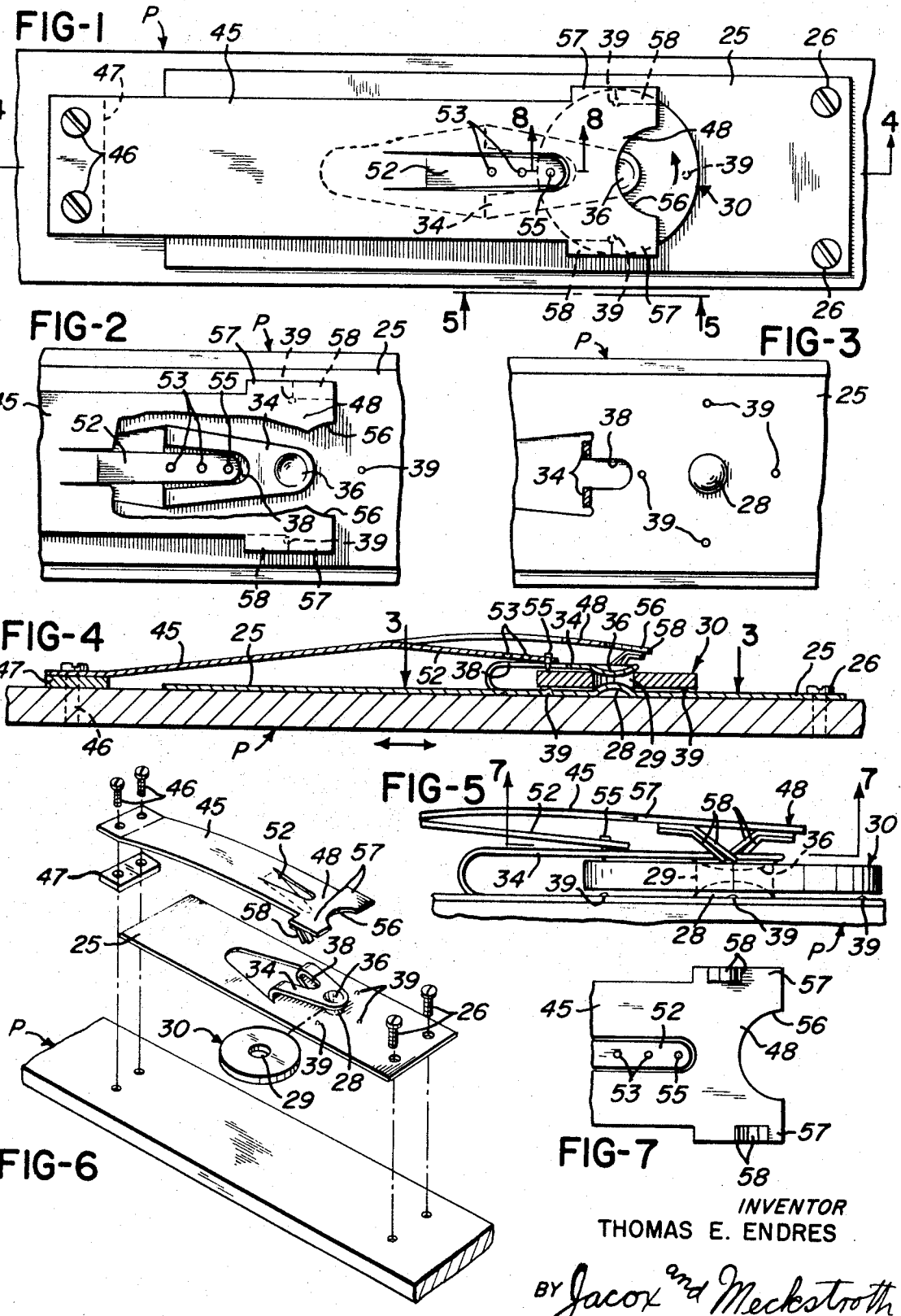

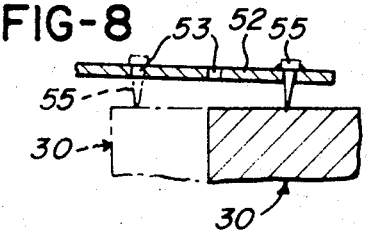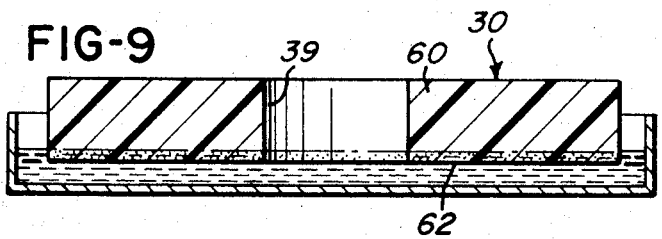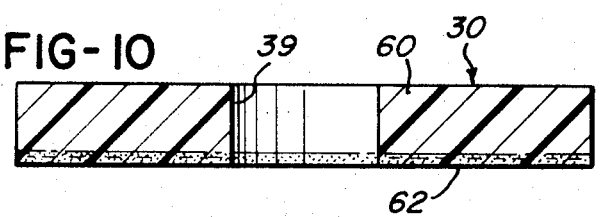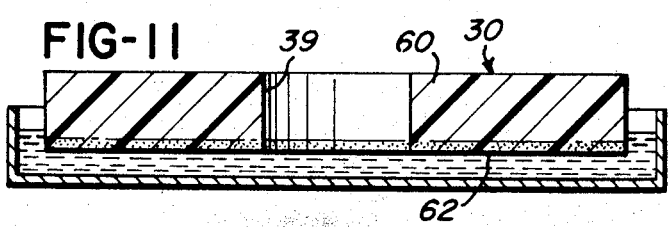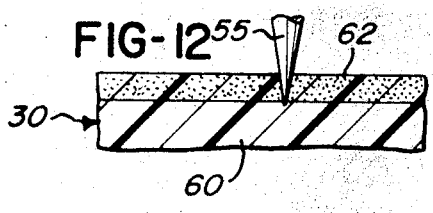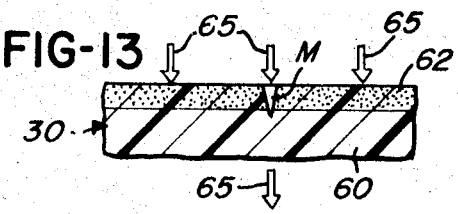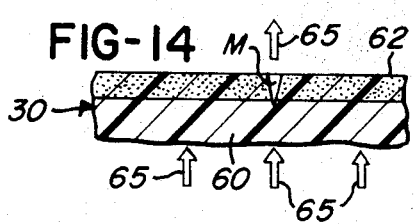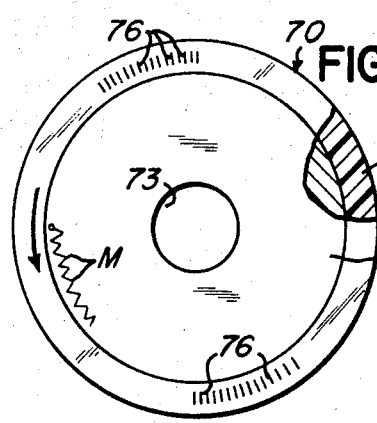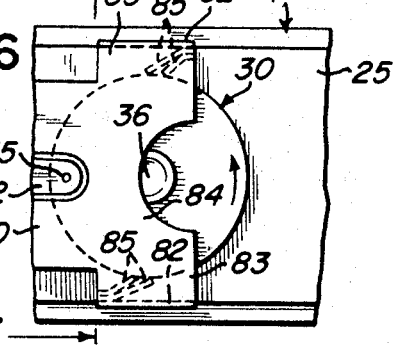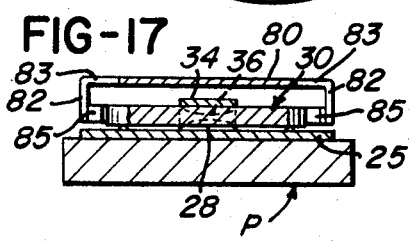

INSTRUMENT FOR MECHANICALLY RECORDING STRAINS

BACKGROUND OF THE INVENTION

In an instrument for mechanically recording the strains of a member when it is subjected to changing stresses, such as the instruments disclosed in U.S. Pat. Nos. 2,081,579 and 3,430,250, a circular disc-like recording target is supported for rotation by a base plate which is secured or attached to one area of the member being monitored or tested. A scratch element is supported in engagement with the upper face of the target by an arm which extends from another base plate which is also secured to the member being monitored or tested. Relative movement of the two base plates effects radial movement of the scratch element on the recording target, and progressive rotation of the target causes the scratch element to record a mark corresponding to each strain resulting from changes in the stresses on the member or as a result of thermal expansion or contraction of the member.

It has been found desirable to provide for positive and predetermined advancement or indexing of the recording target as scratches are made on the target so that marks on the target which represent relative movement between portions of the member to which the instrument is attached can be clearly distinguished. Thus the lines representing compression or contraction of the member can be clearly distinguished from lines representing tension or expansion of the member.

In U.S. Pat. No. 2,081,579, the target is rotated by a clock-type torsion spring which applies a continuous torque to the target, causing it to rotate when the scratch element moves radially of the target. The torsion advancement spring results in uncontrolled advancement of the target, and if the scratch element is vibrated or jolted out of engagement with the disc, the torsion spring would unwind and spin the disc so that the instrument would no longer be effective.

In U.S. Pat. No. 3,430,250, the target is rotated or advanced only when the member being monitored is compressed or contracts. As a result, only radial scratch marks are produced when the member is tensioned or expands. As a result, when the changes in strains are extremely small, a scratch mark representing compression or contraction may be so close to a scratch mark representing tension or expansion that it is sometimes difficult to distinguish the scratch marks.

SUMMARY OF THE INVENTION

The present invention is directed to an improved mechanical strain recording instrument of the type generally disclosed in the above patents and which provides an important advantage of positively and precisely advancing or rotating the target in one direction in response to movement of the recording element in either direction relative to the target so that all marks including those representing extremely small strains can be clearly distinguished and analyzed. The recording instrument of the invention also provides for accommodating targets of simple economical construction and which may be of different sizes. In addition, the instrument provides for quickly and conveniently replacing targets and for conveniently changing the degree of rotation or advancement of the target with a given linear movement of the recording element. The present invention also provides for an improved target which is not only inexpensive in construction but which may be conveniently and rapidly analyzed with optical reading equipment.

In accordance with one embodiment of the invention, a flat washer-like annular target is rotatably supported by a U-shaped spring clamp having portions which project into the center hole of the target and which are capable of receiving targets of different sizes or outside diameters. A recording or scratch element is supported in contact with a radial face of the target by a cantilevered arm which also supports two sets of spring actuating fingers positioned in diametrically opposed relation to the target and located at 90 degrees relative to the direction of linear movement between the target and the scratch element. The spring fingers engage the upper radial face of the target and are arranged in the same direction relative to the target to effect rotation of the target in response to either direction of movement of the supporting arm and scratch element relative to the target.

In another embodiment of the instrument, the actuating mechanism for advancing or rotating the target, includes diametrically opposed sets of spring fingers which engage the peripheral cylindrical surface of the target and which provide for positively and precisely advancing the target with each movement of the recording or scratch element.

Preferably, the target is constructed of a clear transparent plastics material and has a tinted face portion which is adapted to be penetrated by the scratch element. When scratch marks on the target are studied or interpreted, or analyzed, light is directed axially toward the target, and the light passing through the scratch marks provides a high contrast with the light passing through the rest of the target, so that the scratch marks can be easily detected by an optical analyzer.

Other features and advantages of the invention will be apparent from the following description, the accompanying drawings and the appended claims.

BRIEF DESCRIPTION OF THE DRAWINGS

FIG. 1 is a plan view of a recording instrument constructed in accordance with the invention and shown mounted on a test member;

FIG. 2 is a fragmentary plan view of the instrument with a portion broken away to show the structure for rotatably supporting a target;

FIG. 3 is a fragmentary section taken generally on the line 3—3 of FIG. 4;

FIG. 4 is a longitudinal section taken generally on the line 4—4 of FIG. 1;

FIG. 5 is an enlarged fragmentary elevational view taken generally on the line 5—5 of FIG. 1;

FIG. 6 is an exploded perspective view of the instrument shown in FIG. 1 and at a somewhat smaller scale;

FIG. 7 is a fragmentary section taken generally on the line 7—7 of FIG. 5, but at a reduced scale;

FIG. 8 is a fragmentary section taken generally on the line 8—8 of FIG. 1, but at an enlarged scale, and illustrating a modification in phantom;

FIGS. 9–11 illustrate a method of producing a recording target in accordance with the invention;

FIGS. 12–14 illustrate methods of recording and detecting strain information on a target produced as shown in FIGS. 9–11;

FIG. 15 is an axial view of a target constructed in accordance with a modification of the invention and after it has been used on a recording instrument as shown in FIGS. 1–7;

FIG. 16 is a fragmentary plan view of a recording instrument constructed in accordance with another embodiment of the invention; and FIG. 17 is a section taken generally on the line 17—17 of FIG. 16.

DESCRIPTION OF THE PREFERRED EMBODIMENTS

The recording instrument shown in FIG. 1 is adapted to record the strain history of a part or member when the member is subjected to changes in stress such as by changes in tension and compression forces exerted on the member or when the member changes in dimensions due to thermal expansion and contraction. For purposes of illustration and simplification, the member is shown in the form of an elongated metal plate P.

In the embodiment of FIGS. 1–7, the recording instrument includes an elongated rectangular first base plate 25 which is preferably constructed of a noncorrosive metal such as stainless steel and which has one end portion rigidly secured to the test plate P such as by a suitable cement or a set of screws 26. A part-spherical projection or dimple 28 projects upwardly from the plate 25 and into the center hole 29 of a circular washer-like disc or target 30 which is preferably formed of a plastics material as will be explained later. The base plate 25 also includes an integral finger portion or member 34 which is lanced or formed out of the base plate and folded back over the base plate to form a U-shaped spring clamping member for receiving the target 30. The finger member 34 includes a downwardly formed part-spherical dimple 36 which opposes the dimple 28 for projecting into the upper end of the center hole 29 of the target 30. Thus to remove and replace a target 30, the finger member 34 is sprung upwardly to permit the target 30 to pass between the opposing dimples 28 and 36. A slot 38 is formed within the finger member 34 and extends through the base plate 25, and a set of four small part-spherical dimples 39 project upwardly from the base plate 25 to provide a back-up support for the target 30 to assure that the target remains parallel to the base plate 25.

The recording instrument also includes another elongated base plate or arm 45 which has one end portion also rigidly secured to the test member or plate P by a suitable cement or a set of screws 46 extending through the end portion and a spacer plate or pad 47. The second base plate or arm 45 projects cantileveredly above the base plate 25 and has an opposite end or head portion 48 which is positioned above the circular target 30 and the finger member 34 which retains the target. A finger member 52 is formed or lanced out of the intermediate portion of the arm 45 and slopes downwardly so that its forward end portion extends into the slot 38 within the target retaining finger member 34 to a position overlying the inner edge portion of the target 30. A series of three small holes 53 is formed within the forward end portion of the finger member 52, and a recording element or stylus 55 is secured in the foremost hole 53 and has a sharp point which is effective to engage and scratch the surface of the target 30 as will be explained later. Preferably, the recording element or stylus 55 is formed of diamond or hard steel and is secured within one of the holes 53 by a hardenable material such as solder or epoxy.

A semi-circular recess 56 is formed within the head portion 48 of the arm 45 and the head portion 48 includes laterally projecting wings 57. Two sets of actuating members or fingers 58 are secured to the wings of the head portion 48 and are located in diametrically opposed positions relative to the target 30 and at 90° relative to a line connecting the point of the stylus 55 with the axis of the target 30. As best shown in FIG. 5, each pair of angularly formed actuating fingers 58 are positioned in adjacent overlying relation and slope downwardly from the wings 57 of the head portion 48 to form an angle of approximately 30° with the upper surface or face of the target 30.

Preferably, each finger 58 is formed of a slightly flexible sheet material such as stainless steel or half-hard beryllium copper so that it has a slight spring characteristic. As shown in FIG. 1, the diametrically opposed sets of actuating fingers 58 are angularly orientated in the opposite direction relative to each other and are positioned so that the lower square edges of each set of fingers 58 engages the outer peripheral portion of the upper face of the target 30 directly above the corresponding pair of small dimples 39 projecting upwardly adjacent the bottom face of the target 30.

As mentioned above, the two sets of actuating fingers 58 engage the outer peripheral portion of the upper face of the target 30, and the point of the recording element or stylus 55 engages the upper face of the target 30 radially inwardly of the portion of the target engaged by the actuating finger 58. When the instrument is in use for recording or monitoring the strains encountered by a part or member such as the plate P, the actuating fingers 58 are effective to rotate or index the target 30 in a counterclockwise direction (FIG. 1) with each linear movement of the arm 45 relative to the base plate 25. That is, when the plate P expands or is subjected to tension force stresses, the set of fingers 58 mounted on one side of the arm 45 effectively push and rotate the target 30 counterclockwise due to the extension of the arm 45 relative to the base plate 25, while the other set of fingers slide on the face of the target. When the plate P contracts when subjected to a compression stress or a release of a tension stress, the set of fingers 58 on the opposite side of the arm 45 are effective to rotate the target counterclockwise while the other set of fingers slide on the face of the target. Of course, the fingers 58 may be angularly reversed in direction with respect to the target 30 to reverse the direction of rotation of the target 30.

Simultaneously with the relative movement between the arm 45 and the base plate 25, the stylus 55 records on the target 30 corresponding lines by scratching the upper surface of the target. Thus since the target 30 is rotating with each scratch mark made by the stylus 55, all of the scratch marks extend at an angle relative to a radial line extending from the center of the target through the point of the stylus 55. As mentioned above, this rotation of the target 30 with each movement of the arm 45 relative to the base plate 25 is especially important when recording extremely small strains so that the corresponding scratch marks diverge and can be easily identified when the marks are being interpreted or analyzed.

Referring to FIGS. 9–11 which generally illustrate the steps of producing a target 30 in accordance with the invention, a washer-like body 60 is formed of a light transmittable plastics material which is preferably clear and transparent. One material which has proven satisfactory is manufactured by the General Electric Company and sold under the trademark Lexan. A face portion 62 of the body 60 is dipped into a solution of alcohol having a small percentage of xylene which is effective to dissolve or soften the face portion 62 of the body 60. The solution also contains a small percentage of red dye powder which is effectively dissolved by the xylene. One die which has proved satisfactory is sold by the GAF Corporation under the trademark Sudan-3.

The face portion 62 of the target body 60 is left in the solution for a time sufficient for the dissolved dye particles to penetrate the body and form a red tinted face portion 62 having a thickness which is substantially exaggerated in FIG. 10 for purpose of illustration. The face portion 62 of the body 60 is then dipped into a solution of alcohol which is effective to stop the penetration of the xylene into the body 60 and cause the face portion 62 to resolidify or reharden with the entrapped red dye particles. The body 60 is then rinsed in fresh water. Both methyl and isopropyl alcohol have been found effective to dilute the xylene sufficiently to stop the dissolving or softening action of the xylene on the body 60. The darkness of the tinted face portion 62 may be controlled by changing the concentration of the dye powder which is dissolved in the alcohol-xylene solution, and the depth of the dye penetration or thickness of the face portion 62 may be controlled by changing the concentration of xylene within the alcohol and/or by changing the time during which the face portion 62 of the body 60 is submerged in the alcohol-xylene solution.

Referring to FIGS. 12-14, a target 30 constructed in a manner as described above in connection with FIGS. 9-11, provides the feature that the target may be more readily and accurately read and analyzed with optical viewing or sensing equipment. That is, the tinted face portion 62 of the target body 60 is such that the pointed tip of the recording element or stylus 55 produces scratch marks M which extend through the face portion 62 and into the clear transparent remaining portion of the body 60. To analyze the scratch marks M on the target 30, light rays 65, which may be any suitable color to provide a high contrast between the scratch mark and other portions of the target, are directed through the target from either the side of the tinted face portion 62 (FIG. 13) or from the opposite side (FIG. 14). The light passes through the scratch marks M and provides a high contrast with the light which passes through the tinted face portion 62 of the target body 60. This permits the light rays 65 to be clearly detected or sensed either visually through a microscope or by optical sensing and analyzing equipment. The face portion 62 may be, for example, tinted red since red light which passes through the face portion may be easily filtered out optically by the optical sensing equipment.

In accordance with another embodiment of the invention, an annular target 70 (FIG. 15) includes a washer-like metal inner portion 72 having a center hole 73 with a diameter the same as the center hole 29 of the target 30. A ring-like outer portion 74 is secured to the inner portion 72 and is formed of a relatively softer plastics material. Preferably, the inner portion 72 is formed of brass, and the outer portion 74 is formed of a plastics material such as the Lexan material referred to above. The size of the brass inner portion 72 is sufficiently large that the recorded scratch marks M are recorded by the stylus 55 on the upper face of the brass inner portion 72. However, the actuating or advancing fingers 58 are positioned to engage the outer cylindrical portion 74 of the target 70.

The primary advantage of this composite target construction is that the actuating fingers 58 more effectively grip the softer plastics material of the outer ring portion 74 when the fingers move forwardly or advance and more effectively slide on the upper face of the ring portion 74 when the fingers move rearwardly or retract on the upper face of the target 70. In fact, the actuating fingers 58 actually produce fine teeth-like imprints or marks 76 on the upper surface of the outer ring portion 74 as the target 70 is rotated or indexed by relative linear movement of the arm 45 to the base plate 25. The marks 76 are desirable in that they provide a visual indication that the instrument has been operating properly and that the target 70 has been rotated during the period of time the instrument was in service. Since the entire body 60 of the target 30 is constructed of a relatively softer plastics material, the mark 76 would also be produced on the target 30 after it is rotated by the actuating fingers 58.

Referring to FIGS. 16 and 17 which show another embodiment of the invention, a target such as a target 30 or 70 is mounted on a recording instrument which is constructed substantially the same as the recording instrument shown in FIGS. 1-6 except that an arm 80 includes side flanges 82 which project downwardly from the wings 83 of a head portion 84 and support diametrically opposed sets of actuating members or fingers 85 which engage the outer peripheral or cylindrical surface of the target 30. The actuating fingers 85 function in the same manner as the actuating fingers 58, that is, to rotate or advance the target 30 counterclockwise (FIG. 16) with each linear movement of the arm 80 relative to the base plate 25. Thus in this embodiment, the recording instrument is designed for a target having a specific outside diameter, for example, a 1 inch diameter. Since the remaining components of the instrument shown in FIG. 16 are identical to those described above in connection with the instrument of FIGS. 1-7, the same reference numbers have been used for like components.

From the drawing and the above description, it is apparent that a mechanical strain recording instrument constructed in accordance with the invention provides desirable features and advantages. For example, as a result of the actuating mechanism which positively and precisely advances the target with each linear movement of the arm 45 or 80 relative to the base plate 25, regardless of the direction of movement, the scratch marks M representing extremely small strains are distinct and clear and may be easily detected and analyzed.

Another important advantage is provided by the simple construction of the instrument including the construction of the target 30. For example, the instrument has only two major components, both of which may be formed of sheet metal such as stainless steel. Also, there are no rotating parts other than the target, which requires no circumferential rib or groove. Furthermore, since the actuating fingers 58 engage only the upper radial face of the target 30, the outer cylindrical surface or diameter or size of the target is not critical, thereby enabling the target to be more economically produced. In addition, the degree of rotation of the target 30 with a given linear movement between the arm 45 and base plate 25, may be conveniently changed simply by changing the location of the actuating fingers 58 relative to the center axis of the target 30. For example, if greater rotation of the target is desired, the actuating fingers 58 are merely positioned inwardly on the head portion 48 of the arm 45 before the actuating fingers are soldered or otherwise secured to the head portion 48.

As mentioned above, the recording instrument shown in FIGS. 1–7 is capable of accommodating targets 30 of different diameters, according to the amount of information which is desired to be recorded on the target. For example, the arm 45 may be formed with longer wings 57 on the head portion 48, and the wings 57 could be trimmed to correspond to the diameter of the target 30 so that the actuating fingers 58 would contact or engage the other peripheral portion of the target 30. Furthermore, the recording element or stylus 55 may be selectively positioned in any one of the holes 53 as illustrated in FIG. 8, for accommodating targets of different diameters without requiring any other changes in the structure of the instrument.

Another important feature is provided by the support of the target 30 by clamping members which project into the center hole of the target. This supporting structure permits a target to be conveniently replaced from the front or either side of the instrument. This replacement feature is especially desirable when the instrument is located in a corner or adjacent a wall or in some other confined space. It has also been determined that for some applications, the finger member 34 which helps to retain the target 30 on the bottom dimple or projection 28 may be eliminated. For example, when the instrument is used for recording the strains encountered by a member which is not subject to sudden jolts or shocks, the downward forces exerted by the actuating fingers 58 and the stylus 55 are sufficient to retain the target 30 on the bottom center projection 28. It has also been found that the slot formed within the arm 45 by lancing the finger member 52 downwardly, may continue or extend through to the semi-circular notch or recess 56 within the head portion 48 of the arm. This construction permits each wing 47 of the arm 45 to move or flex separately or individually and thereby provide for slight independent floating movement of each set of actuating fingers 58 to assure that the lower straight edges of the fingers firmly and squarely engage the upper face of the target 30.

Another important feature of the invention is provided by a target constructed as shown in FIGS. 9–11. That is, the light transmitting plastics material forming the body of the target 30 is not only an inexpensive material, but provides for etching or treating a face portion of the target so that the scratch marks on the target may be more clearly detected and analyzed by projecting light upon the target, for passing light through the target or for reflection of light from the target. The specific method disclosed for treating or etching the face portion 62 of the target is especially desirable in that the clear transparent target is provided with a tinted face portion 62 which will not chip or crack. Moreover, the tinted face portion 62 is effective to produce light rays which can be readily filtered out by optical means so that substantially the only light which is detected is the light which passes through the scratch marks M within the face portion 62 of the target.

The composite target 70 shown in FIG. 15 may be used on a recording instrument constructed in accordance with the invention when it is desired to form the scratch marks on a metal surface and to read or analyze the scratch marks with the aid of reflected light. As mentioned above, the outer plastics ring portion 74 of the target 70 provides a somewhat softer surface for engagement by the actuating fingers 58 and assures that the fingers will positively advance the target instead of slipping on the upper face of the target when the actuating fingers advance or move forwardly.

While the forms of recording instruments and the methods of producing targets herein described constitute preferred embodiments of the invention, it is to be understood that the invention is not limited to these precise forms of instruments and methods, and that changes may be made therein without departing from the scope and spirit of the invention.

The invention having been described, the following is claimed:

1. In an instrument adapted for mechanically recording on a target the strains of a member subjected to changing stresses, and including first support means adapted to be attached to the member and being effective to support the target for rotation, a recording element having a point, second support means also adapted to be attached to the member and being effective to support said recording element with said point in engagement with the target, said recording element being effective to move in a generally radial direction relative to the target in response to linear relative movement between said first and second support means in either direction to produce marks on target, the improvement comprising actuating means for positively and incrementally rotating the target in one direction in response to said linear movement between said first and second support means in either direction.

2. An instrument as defined in claim 1 wherein said actuating means comprise first and second actuating members positioned in substantially diametrically opposed spaced relation to the target and substantially on a line extending through the axis of rotation of the target and normal to said linear direction of movement of said first and second support means.

3. An instrument as defined in claim 2 wherein said actuating members are positioned to engage a radial face of a disc-like target.

4. An instrument as defined in claim 3 wherein said actuating members are effective to mark the radial face of the target for visually indicating the extent of rotation of the target during the period the instrument has been in service.

5. An instrument as defined in claim 2 wherein said actuating members are positioned to engage the peripheral surface of a disc-like target.

6. An instrument as defined in claim 2 wherein said actuating members comprise generally flat spring fingers extending angularly relative to the target and in opposite directions relative to each other.

7. An instrument as defined in claim 2 wherein each said actuating member comprises a plurality of generally flat spring fingers positioned in overlying adjacent relation.

8. An instrument as defined in claim 1 including means for locating said recording element at different radial positions relative to the target to provide for recording at different radial positions on the target.

9. An instrument as defined in claim 1 wherein said first support means include a member positioned to project into a center hole formed within the target.

10. An instrument as defined in claim 1 wherein said first support means comprise a generally U-shaped spring clamp having opposing portions which are positioned to project from opposite sides of the target and into a center hole formed within the target.

11. An instrument as defined in claim 1 wherein said first support means and said actuating means are effective to accommodate circular recording targets of different diameters.

12. An instrument as defined in claim 1 wherein said target comprises a body of light transmittable plastics material, and said body includes a tinted radial face portion.

13. An instrument as defined in claim 1 wherein said target comprises a composite body including an inner portion and an outer portion, and said inner portion has a hardness substantially greater than the hardness of said outer portion.

14. In an instrument adapted for mechanically recording on a target the strains of a member subjected to changing stresses, and including first support means adapted to be attached to the member and being effective to support the target for rotation, a recording element having a point, second support means also adapted to be attached to the member and being effective to support said recording element with said point in engagement with the target, said recording element being effective to move in a generally radial direction relative to the target in response to linear relative movement in either direction between said first and second support means to produce marks on target, the improvement comprising actuating means for positively and incrementally rotating the target in response to said linear movement between said first and second support means, and said actuating means include first and second actuating members located in substantially diametrically opposed relation to the target and positioned to engage a radial face of the target.

15. An instrument as defined in claim 14 wherein said actuating members each comprise a plurality of thin fingers positioned in adjacent relation.

16. In an instrument adapted for mechanically recording on a target the strains of a member subjected to changing stresses, and including first support means adapted to be attached to the member and being effective to support the target for rotation, a recording element having a point, second support means also adapted to be attached to the member and being effective to support said recording element with said point in engagement with the target, said recording element being effective to move in a generally radial direction relative to the target in response to linear relative movement in either direction between said first and second support means to produce marks on the target, and actuating means for positively and incrementally rotating the disc in response to said linear movement between said first and second support means, the improvement wherein said first support means comprise a generally U-shaped spring clamping member having opposing portions which project into a center hole formed within the target.

17. An instrument for mechanically recording the strains of a member subjected to changing stresses, comprising an annular target having opposite parallel radial faces, first support means adapted to be attached to the member and having a portion engaging the center of said target and supporting said target for rotation, a recording element having a point, second support means also adapted to be attached to the member and being effective to support said recording element with said point in engagement with a radial face of said target, said recording element being effective to move in a generally radial direction relative to said target in response to linear relative movement in either direction between said first and second support means to produce marks on the target, a set of first and second actuating fingers supported by said second support means and positioned in substantially diametrically opposed spaced relation to said target and substantially on a line extending through the axis of rotation of said target in either normal to said linear direction of movement of said first and second support means, and said actuating fingers engaging a radial face of said target and being effective to rotate said target in one direction in response to said linear movement between said first and second support means ineither direction.

18. In an instrument adapted for mechanically recording on a target the strains of a member subjected to changing stresses, and including first support means adapted to be attached to the member and being effective to support the target for rotation, a recording element having a point, second support means also adapted to be attached to the member and being effective to support said recording element with said point in engagement with the target, said recording element being effective to move in a generally radial direction relative to the target in response to linear relative movement between said first and second support means to produce marks on the target, and actuating means for positively and incrementally rotating the target in response to said linear movement between said first and second support means, the improvement wherein the target is annular and defines a center hole, said first support means includes a projection extending into the hole from one side of the target for centering and supporting the target for rotation, and said actuating means includes a set of generally diametrically opposite actuating members engaging the opposite side of the target and tending to retain the target on said projection.

19. An instrument as defined in claim 18 wherein each of said actuating members comprises a substantially flat spring finger.

20. In an instrumtnt adapted for mechanically recording on a target the strains of a member subjected to changing stresses, and including first support means adapted to be attached to the member and being effective to support the target for rotation, a recording element having a point, second support means also adapted to be attached to the member and being effective to support said recording element with said point in engagement with the target, said recording element being effective to move in a generally radial direction relative to the target in response to linear relative movement between said first and second support means to produce marks on said target, and actuating means for positively and incrementally rotating the target in response to said linear movement between said first and second support means, the improvement wherein said actuating means include first and second actuating members located in generally diametrically opposed relation to the target and at substantially 90° relative to said radial direction of movement of said recording element, and said actuating members are positioned to engage diametrically opposite portions of the target.

21. An instrument as defined in claim 20 wherein said actuating members engage one of the radial faces of the target.

* * * * *